June 17, 1952     P. H. DIXON     2,600,492
CARTRIDGE BELT LINK
Filed March 13, 1950
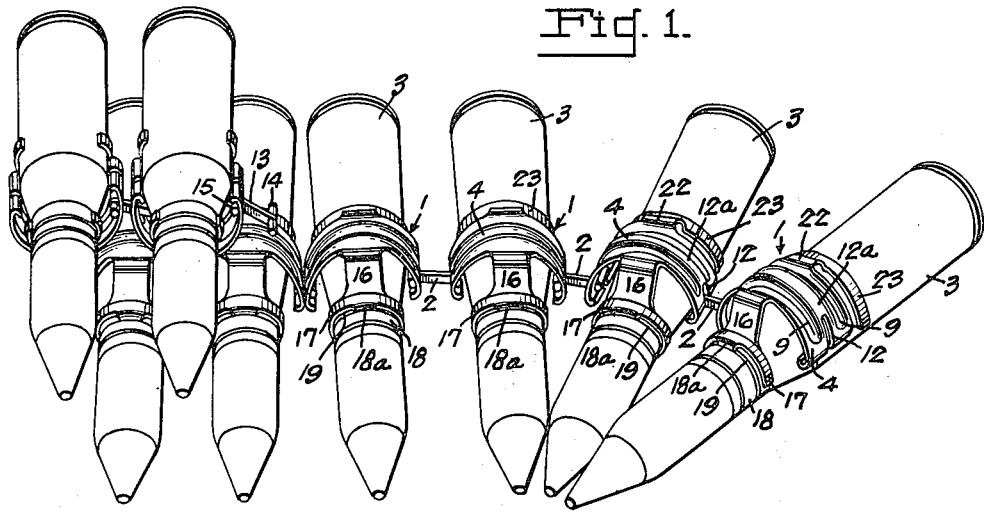
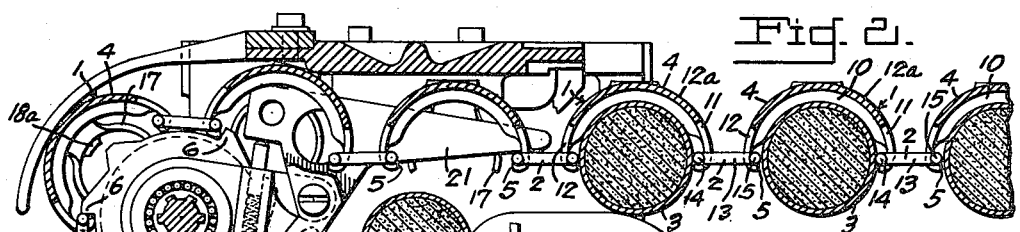
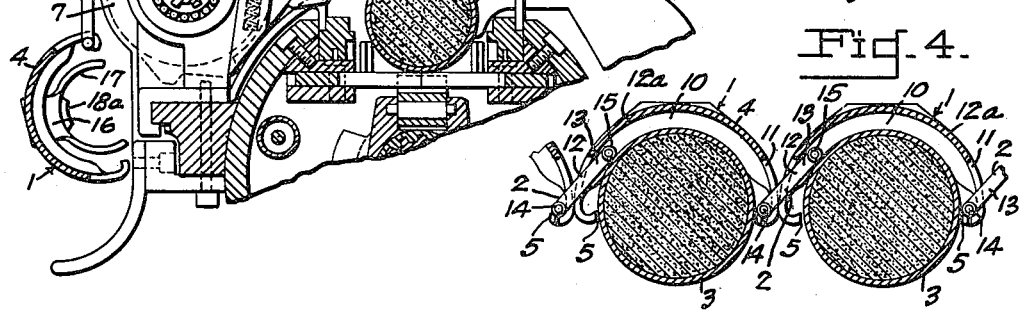
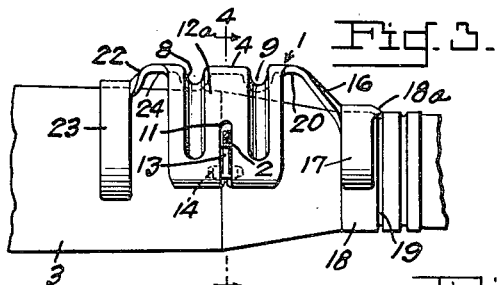
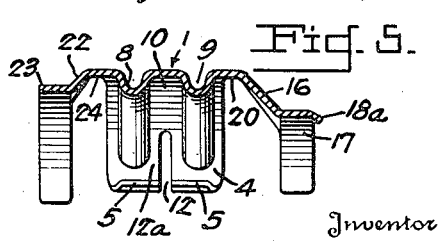
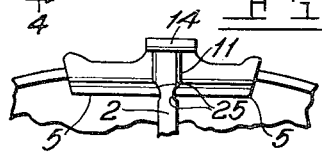
Inventor
Paul H. Dixon
By G. J. Kessenich & J. H. Church
Attorneys Patented June 17, 1952

2,600,492

UNITED STATES PATENT OFFICE 2,600,492

CARTRIDGE BELT LINK

Paul H. Dixon, Rockford, Ill., assignor to the United States of America as represented by the Secretary of the Army Application March 13, 1950, Serial No. 149,330

3 Claims. (Cl. 89—35)

This invention relates to a disintegrating cartridge belt intended for use in feeding rounds of ammunition to automatic aircraft cannon having a cyclic rate of 500 rounds per minute.

It is an object of this invention to provide a flexible link belt from which cartridges are removed by a feed mechanism of the type employing a sprocket and wedging fingers.

Another object of the invention is to provide a flexible link belt in which the rounds may be accurately positioned and firmly held under most severe operating conditions as experienced in aircraft.

Another object of the invention is to provide a belt comprising links having means to prevent endwise drift of the rounds in the links.

Another object of the invention is to provide a flexible link belt to improve the storage pattern.

Another object of the invention is to provide a flexible link belt with a telescopic feature wherein it is possible to feed a round with less than peak force in the belt pull.

The specific nature of the invention as well as other objects and advantages thereof will clearly appear from the following description and accompanying drawings in which:

Figure 1 is a perspective showing the cartridge belt of the invention wherein there is shown the flexibility of the belt.

Figure 2 is a fragmentary sectional view illustrating the cartridge belt mounted on the sprocket type of feed mechanism.

Figure 3 is a side elevation showing one of the links attached to a cartridge case.

Figure 4 is a view taken generally along line 4—4 of Figure 3 showing the telescopic feature of the belt which permits the rounds of the belted ammunition to be substantially tangent to each other when packaged.

Figure 5 is a sectional view of one of the links taken along its longitudinal axis.

Figure 6 is a fragmentary bottom view showing the link detent feature.

Referring now to the drawings by characters of reference, there is shown particularly in Figure 1 a perspective of belted ammunition employing the flexible, disintegrating belt of the invention wherein 1 generally indicates the cartridge engaging link of the belt, 2 the telescoping tab joining the links and 3 the complete rounds of ammunition. The link 1 comprises a cartridge engaging open ring 4 having inwardly turned edges 5 positioned about the center of gravity of the round. The leading edge 5 provides a contacting surface for the teeth 6 of the feed mechanism sprocket 7 as shown in Figure 2. The ring 4 has formed therein inwardly directed circumferential grooves 8 and 9 longitudinally spaced to form a recess 10 therebetween for telescopically receiving H-shaped link connecting tab 2 slidable in slots 11 and 12 cut in the wall 12a of the recess 10. The tab 2 comprises a substantially flat body portion 13 having its opposite ends terminating in cylindrically shaped cross pieces 14 and 15. The slot 11 of each link is crimped at its open end to retain the cross piece 14, best shown as reference character 25 in Figure 6. The slot 12 of each link is not crimped and therefore releasably retains the cross piece 15 of the tab positioned in the adjacent link.

Adjacent the circumferential groove 9 there is formed a forwardly and downwardly directed bridge member 16 supporting an open ring 17 for engagement with the cylindrical neck 18 of the cartridge case. The ring 17 is provided with a detent 18a which engages a crimping groove 19 of the cartridge case and prevents endwise drift of the round. The bridge 16 is formed with a flat portion 20 for receiving one of the wedging fingers 21 as illustrated in Figure 2. The circumferential groove 8 is formed with a bridge member 22 projecting rearwardly thereof and connecting the grooved ring 4 with a cartridge case body engaging open ring 23. The bridge 22 is also provided with a flat portion 24 for receiving the rearwardly positioned wedging finger (not shown) of the feeding mechanism. The rings 4, 17 and 23 are in axial alignment.

The disintegrating cartridge belt of this invention is formed by assembling any desired number of links and tabs as described above. It should be noted that slots 11 and 12 are at least ⅔ the length of flat body portion 13 so that the recess 10 can telescopically receive the tab. When a belt of desired length is obtained and the rounds inserted in the links, the rounds are pushed sidewise toward each other causing the tab of one link to telescope into recess of the adjoining link, as best shown in Figure 4, and forming a compact belt of ammunition. Thus stored, the distance between centers of the rounds of 37 mm. ammunition is but $2\frac{9}{16}$" and when the belt is in extended position the pitch distance between rounds is $3\frac{3}{4}$" as particularly illustrated in Figure 2 of the drawings which also shows the teeth of the feed mechanism sprocket engaging the leading inturned edge of the grooved ring. The telescoping tab feature not only improves the storage pattern, but also makes it possible to feed rounds of ammunition to the gun with less than peak force in the belt pull. The telescoping tab feature in addition to the aforementioned advantages also provides for radial disposition of the rounds, as best shown in Figure 1, required by aircraft installations.

I claim:

1. A disintegrating metallic cartridge belt for use in guns employing a sprocket type feed mechanism and wedging fingers, said belt comprising a multiplicity of resiliently connected cartridge holding links, each of said links having three axially aligned and spaced open loops comprising a center loop positioned about the cartridge at its center of gravity, a forwardly and downwardly directed bridge integral with said center loop formed to receive a wedging finger and supporting a cartridge neck engaging loop, a downwardly struck tongue projecting from the peripheral edge of said neck engaging loop to prevent endwise drift of said cartridge, a rearwardly directed bridge integral with said main loop formed to receive a wedging finger and supporting a cartridge body engaging loop, said center loop having circumferentially formed therein a recess in its underside, said recess being slotted adjacent each longitudinal edge of the center loop, a connecting tab comprising a substantially flat body having a cross piece affixed to each end of said body, said tab positioned in the slots of adjacent links and telescopically received in the recesses of adjacent links, said slots being of greater width than the body of the tab to provide for radial disposition of said links.

2. The device as described in claim 1 wherein said main loop has formed in the periphery two spaced inwardly directed grooves formed by the adjacent vertical walls of said grooves, the top wall of said recess being formed of material intermediate said grooves, the longitudinal edges of the main loop inwardly turned, said top wall slotted circumferentially from each of said edges, an H-shaped link connecting tab, the body of said tab slidably positioned in one of said slots, said body and one leg of said tab being telescopically received in said recess, said tab adapted to be radially disposed about said slot, the other leg of said tab disposed externally of said main loop.

3. The improvement in a metallic cartridge belt of the disintegrating link type for sprocket type feed mechanism comprising three axially spaced open loops constituting a main loop embracing said cartridge intermediate two auxiliary loops, the first of said auxiliary loops adapted to embrace the neck of said cartridge and formed with a detent to engage a circumferential crimping groove in said neck, the second of said auxiliary loops embracing the body of said cartridge, a first bridge member integral with said main loop and joining said first auxiliary loop, said first bridge formed intermediate said loops to receive a wedging finger, a second bridge member integral with said main loop and joining said second auxiliary loop formed intermediate said loops to receive a wedging finger said main loop including a centrally spaced slot at each end thereof and a connecting tab comprising a flat body and a cross piece affixed to each end of said body, said tab positioned in one slot of said loop.

PAUL H. DIXON.

REFERENCES CITED

The following references are of record in the file of this patent:

UNITED STATES PATENTS

| Number | Name | Date |
|---|---|---|
| 2,022,685 | Moore | Dec. 3, 1935 |
| 2,390,331 | Sanford | Dec. 4, 1945 |